(12) United States Patent
Chen et al.

(10) Patent No.: US 11,770,060 B2
(45) Date of Patent: Sep. 26, 2023

(54) VIBRATION MOTOR

(71) Applicant: DELTA ELECTRONICS, INC., Taoyuan (TW)

(72) Inventors: Li-Chun Chen, Taoyuan (TW); Ming-Chih Tsai, Taoyuan (TW); Chieh-Cheng Chen, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 64 days.

(21) Appl. No.: 17/703,073

(22) Filed: Mar. 24, 2022

(65) Prior Publication Data

US 2022/0368207 A1 Nov. 17, 2022

(30) Foreign Application Priority Data

May 14, 2021 (CN) .......................... 202110528894.1

(51) Int. Cl.
*H02K 33/16* (2006.01)
*H02K 1/18* (2006.01)
*H02K 7/06* (2006.01)

(52) U.S. Cl.
CPC ............. *H02K 33/16* (2013.01); *H02K 1/182* (2013.01); *H02K 7/063* (2013.01)

(58) Field of Classification Search
CPC ...................................................... H02K 33/16
USPC .................................. 310/12, 35, 36, 39, 81
See application file for complete search history.

(56) References Cited

U.S. PATENT DOCUMENTS

| | | | |
|---|---|---|---|
| 7,446,445 B2 * | 11/2008 | Huang .................... | H02K 7/061 310/36 |
| 2008/0150379 A1 * | 6/2008 | Hsiao ...................... | H02K 7/063 310/81 |
| 2013/0140918 A1 * | 6/2013 | Choi ....................... | H02K 33/18 310/25 |
| 2015/0123499 A1 * | 5/2015 | Park ........................ | H02K 33/16 310/25 |
| 2016/0141935 A1 * | 5/2016 | Takagi .................... | H02K 7/085 310/81 |
| 2018/0351442 A1 * | 12/2018 | Liu ......................... | H02K 33/14 |
| 2019/0006926 A1 * | 1/2019 | Zhu .......................... | H02K 33/18 |

* cited by examiner

*Primary Examiner* — Quyen P Leung
*Assistant Examiner* — Masoud Vaziri
(74) *Attorney, Agent, or Firm* — Chun-Ming Shih; HDLS IPR SERVICES

(57) ABSTRACT

A vibration motor having an insulating housing, a bidirectional coil and a magnetic ring is provided. The insulating housing is of cylindrical shape and at least three position-limiting ribs are protruded from an internal surface thereof. Each position-limiting rib is extended parallel to a central axial line of the insulating housing. The insulating housing has a pair of end plates on two ends thereof. The end plates are made of insulating material. The bidirectional coil is accommodated in the insulating housing and spaced apart from the internal surface of the insulating housing. The magnetic ring is movably accommodated in the insulating housing, and the magnetic ring is arranged coaxially with the insulating housing to surround the bidirectional coil. The position-limiting ribs are disposed adjacent to the magnetic ring and surround an outer edge of the magnetic ring.

15 Claims, 5 Drawing Sheets

VIBRATION MOTOR

BACKGROUND

Technical Field

This disclosure is related to a vibration motor and in particular to a vibration motor with noise suppression.

Description of Related Art

A related linear motor has a bobbin or at least two coils in order to excite a magnetic vibrator via bipolar coils for reciprocating. However, the linear motor is getting more and more compact, and less space therein is available. The structure has a problem of space utilization, so that the space for winding being occupied or a multi-wire output arrangement may lead to a difficulty of output wiring process.

A related arrangement provides a housing having a metal frame as a part thereof, the magnetic vibrator is of annular shape and a central line thereof is usually positioned via components such as a center column, elastic piece, or spring. There are two configurations of the magnetic vibrator and the coils. If the magnetic vibrator is arranged in the coil, the magnetic vibrator is arranged to sleeve a central pin and slidable along the central pin to vibrate. The positioning method of the central pin may cause noise when moving parts are in movement. If the coil is arranged in the magnetic vibrator, the magnetic vibrator does not contact the housing in a lateral direction thereof. Therefore, elastic pieces or springs should be arranged for clamping the magnetic vibrator along an axial direction thereof, and additional material cost is caused. Furthermore, the elastic members absorb and suppress the vibration caused by the motion of the magnetic vibrator so as to reduce tactile feeling to a user. Moreover, unexpected lateral vibrations may be caused.

In views of this, in order to solve the above disadvantage, the inventor studied related technology and provided a reasonable and effective solution in this disclosure.

SUMMARY OF THE DISCLOSURE

A vibration motor with noise suppression is provided in this disclosure.

A vibration motor having an insulating housing, a bidirectional coil and a magnetic ring is provided. The insulating housing is of a cylindrical shape, and at least three position-limiting ribs are protruded from an internal surface thereof. Each position-limiting rib is extended along a direction parallel with of an central axial line of the insulating housing. The insulating housing has a pair of end plates, one of the end plates is located on one end thereof, the other end plate is located on the other end thereof, and the end plates are made of an insulative material. The bidirectional coil is accommodated in the insulating housing and spaced apart from the internal surface of the insulating housing. The magnetic ring is movably accommodated in the insulating housing, the magnetic ring is arranged coaxially with the insulating housing to surround the bidirectional coil. The position-limiting ribs are adjacent to the magnetic rings to surround an outer edge of the magnetic ring.

According to the vibration motor of this disclosure, a lateral surface of each position-limiting rib is a curved surface.

According to the vibration motor of this disclosure, a positioning pin is arranged in the insulating housing, the positioning pin is arranged along the central axial line of the insulating housing, and the positioning pin is sleeved by the bidirectional coil. The positioning pin and the insulating housing are made in a one-piece form.

According to the vibration motor of this disclosure, the bidirectional coil is clamped between the pair of end plates.

According to the vibration motor of this disclosure, an elastic ring is provided in the insulating housing, a plurality of protrusions are protruded from a side of the elastic ring, and the protrusions are protruded toward the magnetic ring. A cone is formed on each protrusion. The protrusions have a plurality of cones, and a part of the cones are different from the rest of the cones in height. A plane is provided on a tip of each cone.

According to the vibration motor of this disclosure, the bidirectional coil has a first coil set and a second coil set stacked coaxially with each other, and the first coil set and the second coil set are respectively wound in a direction opposite to each other. The vibration motor further has a control circuit board electrically connected to the first coil set and the second coil set. The first coil set is electrically connected to the second coil set.

According to the vibration motor of this disclosure, an outer edge of the bidirectional coil is spaced apart from an inner edge of the magnetic ring. The two sides of the magnetic ring are different from each other in magnetic polarity.

According to the vibration motor of this disclosure, at least three position-limiting ribs are disposed on an internal surface of the insulating housing so as to limit a moving space of the magnetic ring, thereby the magnetic ring is restricted to move only along a central axial line thereof. A contact area between the magnetic ring and a position structure is decreased via the position-limiting rib, and friction and noise are further decreased. Moreover, the positioning accuracy of this disclosure is improved so that the accuracy requirement of parts may be reduced. Furthermore, the bidirectional coil may be directly installed into the insulating housing without insulating by an additional bobbin, thereby the amount of parts may be decreased and the assembling process may be simplified.

DETAILED DESCRIPTION

The technical contents of this disclosure will become apparent with the detailed description of embodiments accompanied with the illustration of related drawings as follows. It is intended that the embodiments and drawings disclosed herein are to be considered illustrative rather than restrictive.

Figure 1:
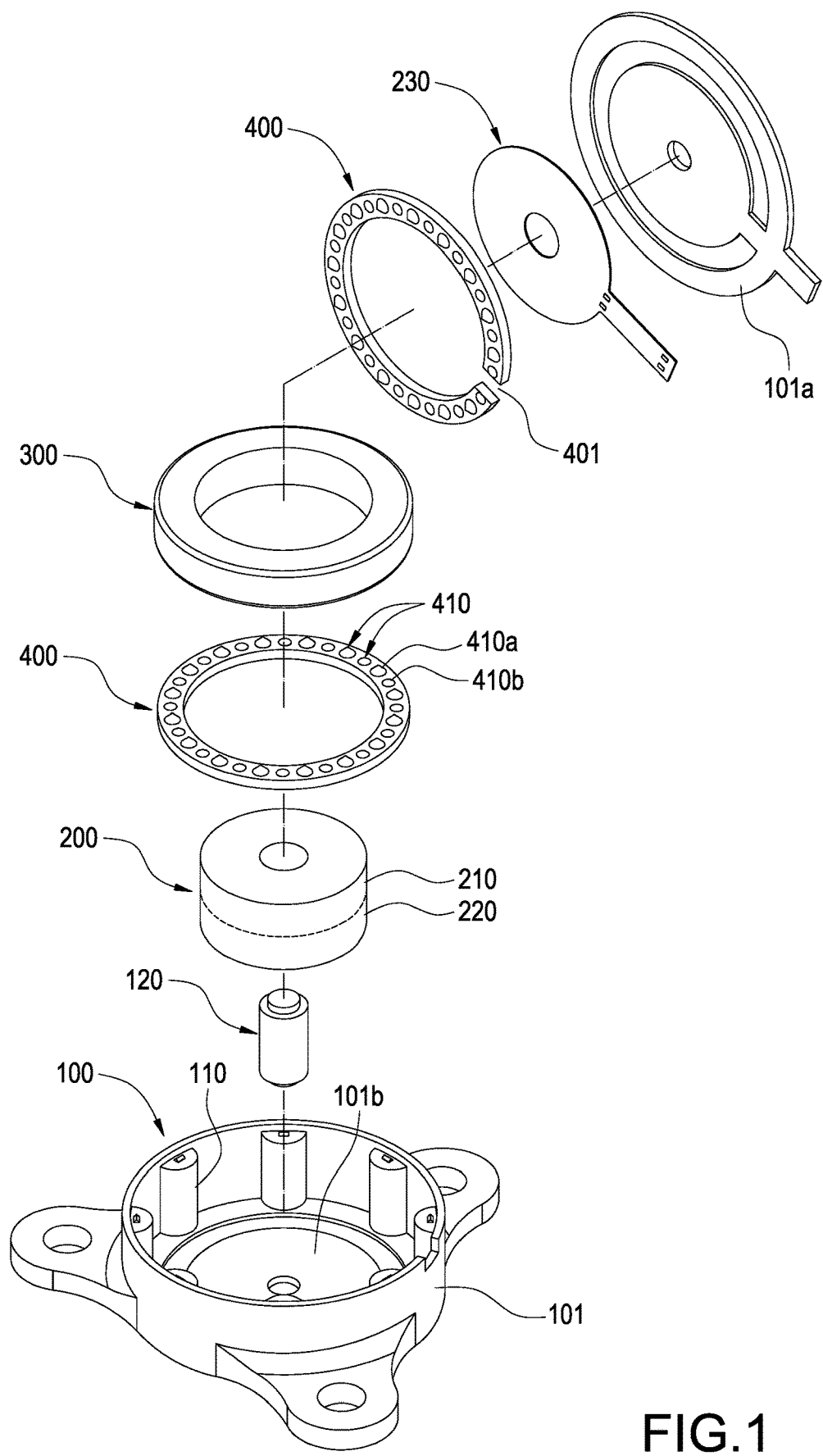
FIG. 1 is an exploded view showing a vibration motor according to this disclosure.
Figure 2:
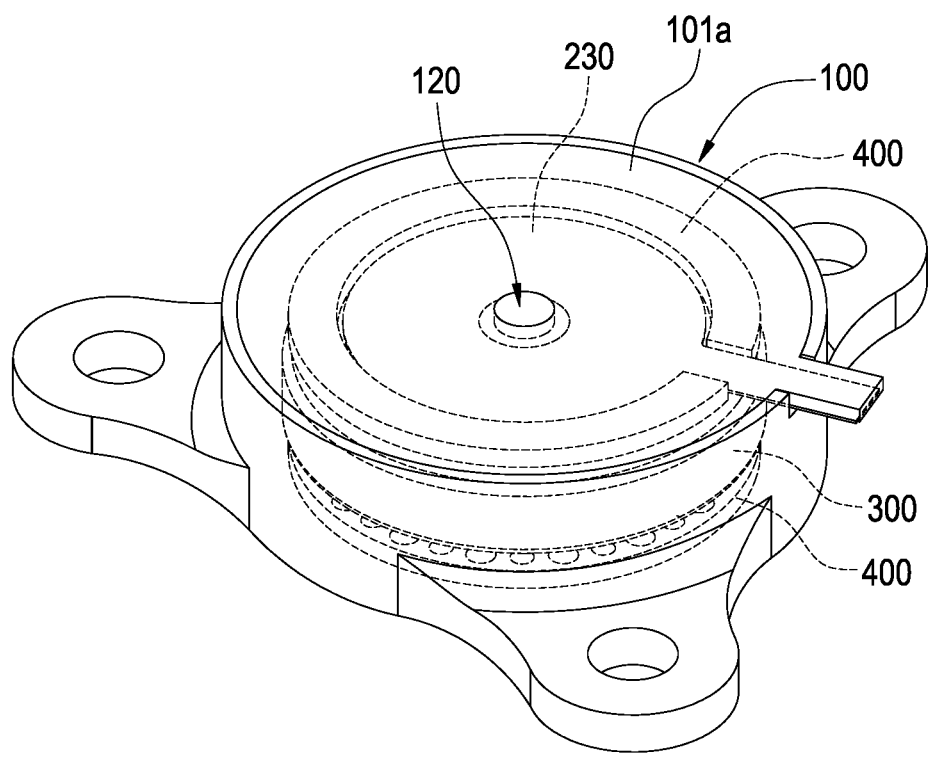
FIG. 2 is a perspective view showing the vibration motor according to this disclosure.
Figure 3:
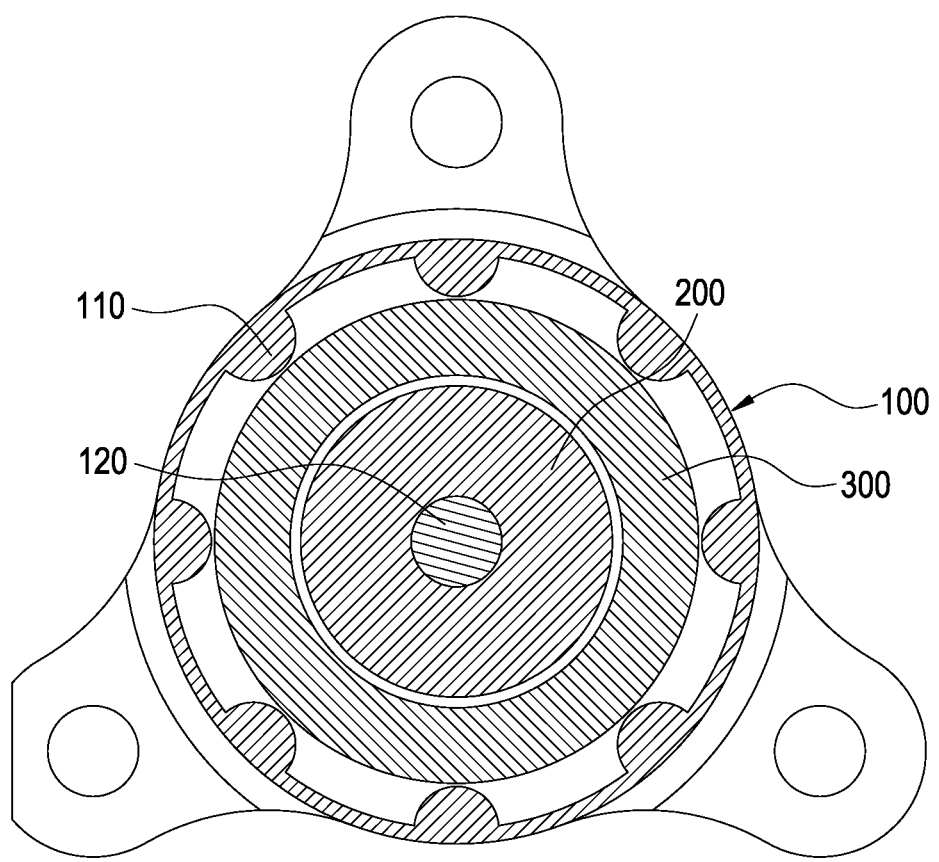
FIG. 3 is a cross-sectional view of FIG. 2.

According to FIGS. 1 to 3, a vibration motor having insulating housing 100, a bidirectional coil 200, a magnetic ring 300 and a control circuit board 230 is provided in an embodiment of this disclosure.

Figure 7:
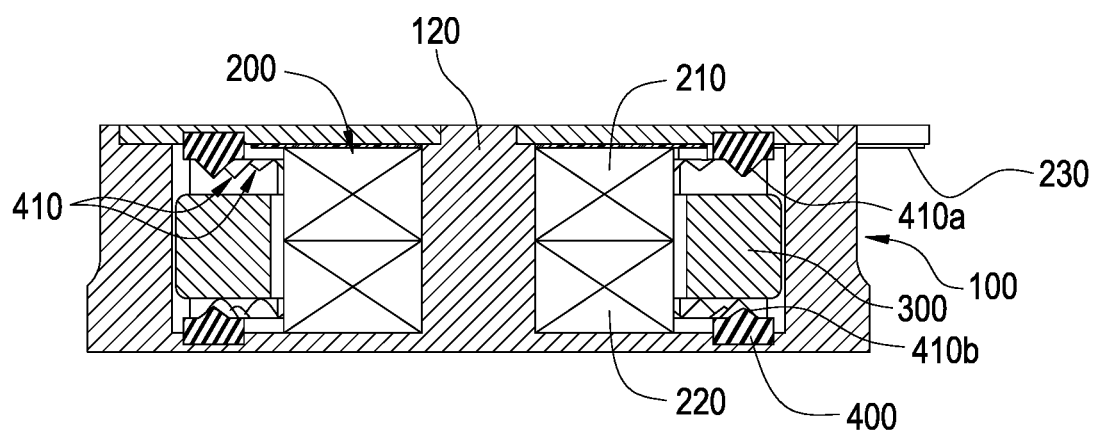
FIG. 7 is an alternative type of the vibration motor according to this disclosure.

The insulating housing 100 is of a cylindrical shape and has a cylinder 101 and a pair of end plates 101a/101b closing two ends of the cylinder 101. In some embodiments, one of the end plates 101b and one end of the cylinder 101 are made in a one-piece form, and the other end plate 101a is detachably arranged on the other end of the cylinder 101. At least three position-limiting ribs 110 are protruded from an internal surface of the insulating housing 100, the respective position-limiting rib 110 is extended along a direction parallel with an axial line of the insulating housing 100. Specifically, the position-limiting ribs 110 are protruded from an internal surface of the cylinder 101, and a lateral surface of each position-limiting rib 110 is a curved surface. A positioning pin 120 is provided in the insulating housing 100, and the positioning pin 120 is assembled in the insulating housing 100 along a central axial line of the insulating housing 100. In some embodiments, the positioning pin 120 and insulating housing 100 may be made in a one-piece form as shown in FIG. 7.

The bidirectional coil 200 is accommodated in the insulating housing 100 and spaced apart from the internal surface of the insulating housing 100. The bidirectional coil 200 is arranged to sleeve the positioning pin 120 and is arranged coaxially with the insulating housing 100, and the bidirectional coil 200 is clamped between the pair of end plates 101a/101b so as to be fixed. Specifically, the bidirectional coil 200 has a first coil set 210 and a second coil set 220 stacked coaxially, and the first coil set 210 and the second coil set 220 are respectively wound in a direction opposite to each other and thereby a bobbin may be omitted. Therefore, more space for winding and wiring is available, and the volume of the vibration motor may be effectively reduced.

The magnetic ring 300 is movably accommodated in the insulating housing 100, the magnetic ring 300 is arranged coaxially with the insulating housing 100 and surrounds the bidirectional coil 200, two sides of the magnetic ring 300 are different from each other in magnetic polarity. An inner edge of the magnetic ring 300 is spaced apart from an outer edge of the bidirectional coil 200, and the position-limiting ribs 110 are arranged adjacent to the magnetic ring 300 and surround the outer edge of the magnetic ring 300. The magnetic ring 300 may be positioned by the position-limiting ribs 110, and the magnetic ring 300 is restricted to move only along the central axial line of the insulating housing 100.

The control circuit board 230 is electrically connected to the first coil set 210 and the second coil set 220 respectively. According to this embodiment, the control circuit board 230 is a flexible printed circuit board and attached on an internal surface of one of the end plates 110a. A portion of the control circuit board 230 is extended to outside of the insulating housing 100 for wiring.

The first coil set 210 and the second coil set 220 may be arranged in parallel, the control circuit board 230 is electrically connected to the first coil set 210 and the second coil set 220 respectively via two wires. In other words, the two wires are wound in opposite directions toward two ends of the bidirectional coil 200 (for example, one wire is wound clockwise, and the other wire is wound counter clockwise) so as to respectively form the first coil set 210 and the second coil set 220. The first coil set 210 has a pair of wire junctions connected to the control circuit board 230, the second coil set 220 also has a pair of wire junctions connected to the control circuit board 230.

In some other embodiments, the first coil set 210 and the second coil set 220 may be arranged in series, the first coil set 210 is electrically connected to the second coil set 220, and the control circuit board 230 is electrically connected to the first coil set 210 and the second coil set 220 respectively via single wire. In other words, a wire is wound from a center segment to two ends of the bidirectional coil 200 in opposite directions (for example, one end of the wire is wound clockwise, and the other end of the wire is wound counter clockwise) so as to respectively form the first coil set 210 and the second coil set 220. The first coil set 210 has single wire junction connected to the control circuit board 230, the second coil set 220 also has single wire junction connected to the control circuit board 230. This arrangement of single wire may be wound without a bobbin so as to increase available space for winding and wiring, and the volume of the vibration motor may be effectively further reduced.

Figure 6:
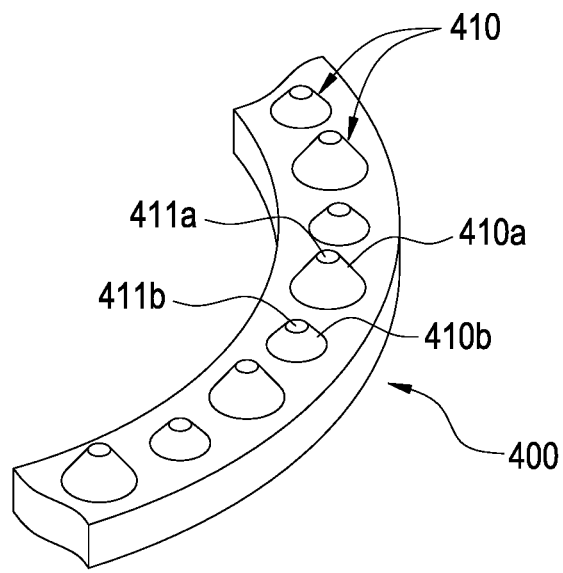
FIG. 6 is a partial enlarged view of the vibration motor according to this disclosure.

At least an elastic ring 400 is arranged in the insulating housing 100, a plurality of protrusions 410 are protruded from a side of the elastic ring 400, and the protrusions 410 are protruded toward the magnetic ring 300. A cone 410a/410b is disposed on each protrusion 410, this arrangement has better performance of impact absorbing than that of a flat surface, and noise is suppressed. The protrusions 410 have a plurality of cones 410a/410b, and a part of the cones 410a are different from the rest of the cones 410b in height. The magnetic ring 300 is movable via gaps formed respectively between it and the position-limiting rib 110 and between it and the bidirectional coil 200, and the magnetic ring 300 is slightly deflected while moving. When the magnetic ring 300 moves, the magnetic ring 300 may collide with any of the cones 410a/410b in various state via various heights of the cones 410a/410b, and the cones 410a/410b of the elastic ring 400 may effectively absorb impacts and further suppress noise. Furthermore, according to FIG. 6, a plane 411a/411b is disposed on a tip of each cone 410a/410b, and the tips are prevented from damages caused by impact.

According to this embodiment, a pair of substantially identical elastic rings 400 is arranged in the insulating housing 100, and a recess (not shown in Figs.) corresponding to a profile of each elastic ring 400 is arranged on each end plate 101a/101b so that the respective elastic ring 400 may be embedded in the recesses of the respective end plate 101a/101b. Moreover, the protrusions 410 on the respective elastic ring 400 are arranged oppositely to each other and face the magnetic ring 300. Furthermore, the elastic ring 400 on the end plate 101a where the control circuit board 230 is located may be further provided with an opening 401 for the control circuit board 230 to penetrate through the insulating housing 100.

Figure 4:
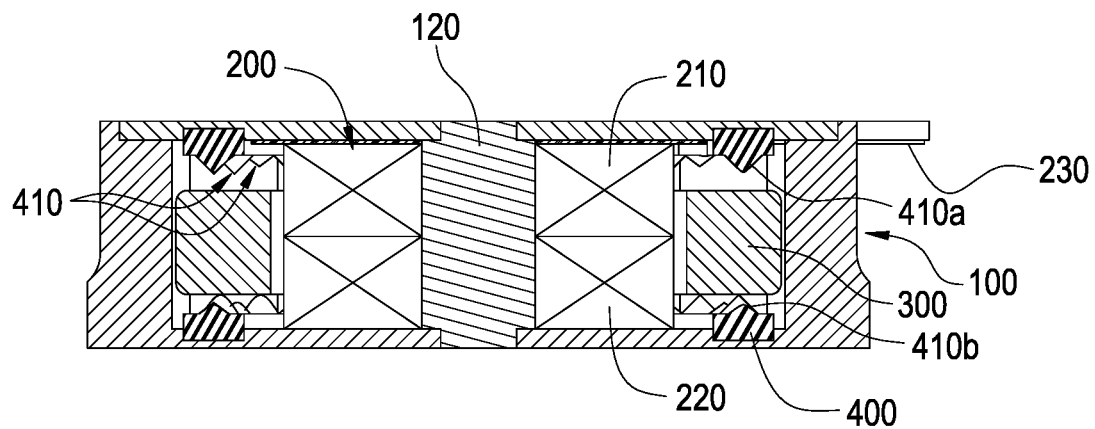
FIGS. 4 and 5 are longitudinal cross-sectional views showing the vibration motor according to this disclosure.
Figure 5:
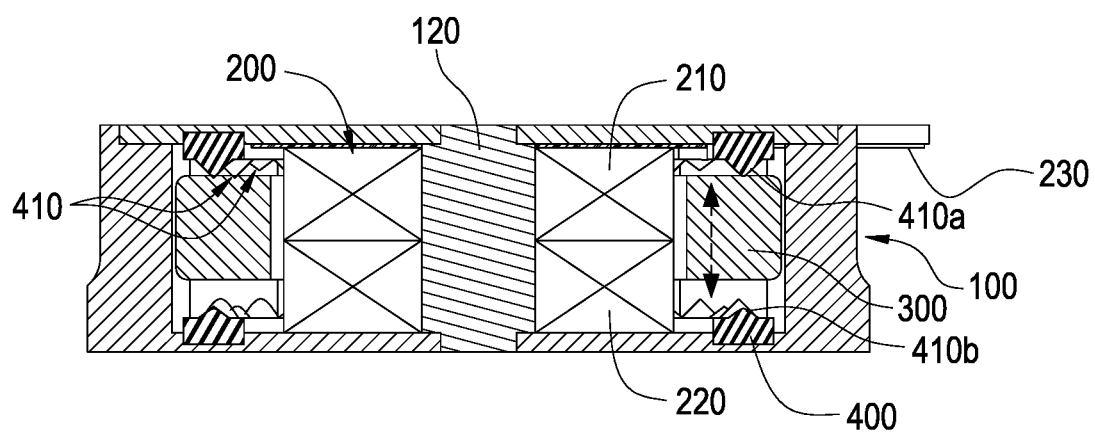

According to this disclosure shown in FIGS. 4 and 5, an excitation is performed via different magnetic poles generated by the bidirectional coil 200, and the magnetic ring 300 reciprocates in the closed insulating housing 100 to cause vibration.

According to FIGS. 1 to 3, this disclosure changes a motion positioning method of the magnetic ring 300 so as to decrease number and accuracy requirement of parts. At least three position-limiting ribs 110 are disposed on the internal surface of the insulating housing 100 to limit a motion space for the magnetic ring 300, and the magnetic ring 300 is restricted to move only along a central axial line thereof. The magnetic ring 300 is positioned more accurately by positioning the outer edge via the position-limiting ribs 110 than positioning a central sliding pin, and the accuracy requirement of parts may be reduced. Furthermore, the bidirectional coil 200 may be directly installed into the insulating housing 100 without an additional bobbin, and the positioning pin 120 may be arranged on the insulating housing 100. Therefore, the amount of parts may be reduced and the assembling process may be simplified.

According to related art, a sliding pin and a magnetic vibrator contact with each other on a surface. However, according to FIG. 3, a lateral surface of the position-limiting rib 110 is a curved surface, and the magnetic ring 300 linearly contacts with the position-limiting rib 110, a contacting area is reduced, and friction and noise are further decreased. According to this disclosure, the elastic rings 400 with protrusions 410 are disposed in the insulating housing 100 for cushion, and noise caused by impact may be effectively suppressed. Furthermore, the parts of this disclosure, namely the insulating housing 100, the end plates 101a/101b, the elastic rings 400 and the positioning pin 120, are made of rubber or plastic so that the material cost may be decreased and the insulation effect may be achieved without additional insulation structures.

While this disclosure has been described by means of specific embodiments, numerous modifications and variations may be made thereto by those skilled in the art without departing from the scope and spirit of this disclosure set forth in the claims.

What is claimed is:

1. A vibration motor, comprising:
an insulating housing, being of a cylindrical shape, and at least three position-limiting ribs protruded from an internal surface thereof, each position-limiting rib extended along a direction parallel with a central axial line of the insulating housing, the insulating housing comprising a pair of end plates, one of the end plates located on one end thereof, the other end plate located on the other end thereof, and the end plates comprising an insulative material;
a bidirectional coil, accommodated in the insulating housing and spaced apart from the internal surface of the insulating housing; and
a magnetic ring, movably accommodated in the insulating housing and arranged coaxially with the insulating housing to surround the bidirectional coil, wherein the position-limiting ribs are adjacent to the magnetic rings to surround an outer edge of the magnetic ring.

2. The vibration motor according to claim 1, wherein a lateral surface of each position-limiting rib is a curved surface.

3. The vibration motor according to claim 1, wherein a positioning pin is arranged in the insulating housing and along the central axial line of the insulating housing, and the positioning pin is sleeved by the bidirectional coil.

4. The vibration motor according to claim 3, wherein the positioning pin and the insulating housing are in a one-piece form.

5. The vibration motor according to claim 1, wherein the bidirectional coil is clamped between the pair of end plates.

6. The vibration motor according to claim 1, wherein an elastic ring is provided in the insulating housing, a plurality of protrusions are protruded from a side of the elastic ring, and the protrusions are protruded toward the magnetic ring.

7. The vibration motor according to claim 6, wherein a cone is disposed on each protrusion.

8. The vibration motor according to claim 6, wherein the protrusions comprises a plurality of cones, and a part of the cones are different from the rest of the cones in height.

9. The vibration motor according to claim 7, wherein a plane is provided on a tip of each cone.

10. The vibration motor according to claim 8, wherein a plane is provided on a tip of each cone.

11. The vibration motor according to claim 1, wherein the bidirectional coil comprises a first coil set and a second coil set stacked coaxially with each other, and the first coil set and the second coil set are respectively wound in a direction opposite to each other.

12. The vibration motor according to claim 11, further comprising: a control circuit board, electrically connected the first coil set and the second coil set.

13. The vibration motor according to claim 12, wherein the first coil set is electrically connected to the second coil set.

14. The vibration motor according to claim 1, wherein an outer edge of the bidirectional coil is spaced apart from an inner edge of the magnetic ring.

15. The vibration motor according to claim 1, wherein at two sides of the magnetic ring are different from each other in magnetic polarity.

* * * * *